United States Patent
Park et al.

(10) Patent No.: US 11,634,364 B2
(45) Date of Patent: Apr. 25, 2023

(54) BORON CARBIDE COMPOSITE AND PRODUCTION METHOD THEREFOR

(71) Applicant: KOREA INSTITUTE OF SCIENCE AND TECHNOLOGY, Seoul (KR)

(72) Inventors: Sang Whan Park, Seoul (KR); Mi Rae Youm, Seoul (KR); Sung Il Yun, Seoul (KR); Jun Hyung Park, Seoul (KR)

(73) Assignee: Korea Institute of Science and Technoloy, Seoul (KR)

( * ) Notice: Subject to any disclaimer, the term of this patent is extended or adjusted under 35 U.S.C. 154(b) by 113 days.

(21) Appl. No.: 17/184,081

(22) Filed: Feb. 24, 2021

(65) Prior Publication Data
US 2021/0269364 A1 Sep. 2, 2021

(30) Foreign Application Priority Data
Feb. 28, 2020 (KR) ........................ 10-2020-0025539

(51) Int. Cl.
*C04B 35/563* (2006.01)
*C04B 35/645* (2006.01)

(52) U.S. Cl.
CPC .......... *C04B 35/563* (2013.01); *C04B 35/645* (2013.01); *C04B 2235/3821* (2013.01);
(Continued)

(58) Field of Classification Search
CPC ............... C04B 35/563; C04B 35/645; C04B 2235/3821; C04B 2235/3826;
(Continued)

(56) References Cited

U.S. PATENT DOCUMENTS 5,418,196 A 5/1995 Niihara
7,442,661 B2 10/2008 Hirao et al.

FOREIGN PATENT DOCUMENTS

CN 108484171 A * 9/2018 ........... C04B 35/563
EP 1892227 B1 12/2012
(Continued)

OTHER PUBLICATIONS

Reference—Yu Liang, et al. "Microstructure and mechanical properties of hot-pressed C-SiC-B4C-TiB2 composites." Chinese Journal of Nonferrous Metals 18.2 (2008): 271-277. (Year: 2008).*
(Continued)

*Primary Examiner* — Karl E Group
*Assistant Examiner* — Cameron K Miller
(74) *Attorney, Agent, or Firm* — Rabin & Berdo, P.C.

(57) ABSTRACT

The present disclosure provides a boron carbide composite material having a novel composition with excellent mechanical properties, and a production method therefor. The boron carbide composite material has high fracture toughness and may be applied as a lightweight bulletproof ceramic material. The boron carbide composite material is a boron carbide/silicon carbide/titanium boride/graphite ($B_4C$—SiC—$TiB_2$—C) composite material. The composite material may overcome a technical limitation on increasing the fracture toughness of the boron carbide composite material, and may be produced as a high-density boron carbide composite material using a reactive hot-pressing sintering process at a relatively low temperature. The boron carbide composite material having excellent mechanical properties may be applied to general industrial wear-resistant parts and nuclear-power-related industrial parts, and particularly, may be actively used as a lightweight bulletproof material for personal use and for military aircraft including helicopters.

11 Claims, 4 Drawing Sheets

(52) U.S. Cl.
CPC ........... C04B 2235/3826 (2013.01); C04B 2235/3843 (2013.01); C04B 2235/425 (2013.01); C04B 2235/6562 (2013.01); C04B 2235/6567 (2013.01); C04B 2235/6581 (2013.01); C04B 2235/786 (2013.01); C04B 2235/96 (2013.01)

(58) Field of Classification Search
CPC ...... C04B 2235/3843; C04B 2235/425; C04B 2235/6562; C04B 2235/6567; C04B 2235/6581; C04B 2235/786; C04B 2235/96
See application file for complete search history.

(56) References Cited

FOREIGN PATENT DOCUMENTS

| | | |
|---|---|---|
| JP | 2013500227 A | 1/2013 |
| KR | 101086661 B1 | 11/2011 |
| KR | 1020200019068 A | 2/2020 |

OTHER PUBLICATIONS

CN108484171A EspaceNet machine translation (Year: 2018).*
CN108484171 A—Google Patents machine translation (Year: 2018).*
Burcu Ertuğ et al., "Microstructural and mechanical properties of hot-pressed (B4C, SiC)/TiB2 Composites". Cfi/Ber. DKG 89. No. 11-12, 2012.
F. Ye, et al., "Densification and mechanical properties of spark plasma sintered $B_4C$ with Si as a sintering aid," J. Am. Ceram. Soc. 93 (Oct. 2010) 2956-2959.
J. Han, et al., "Reaction Synthesis and Mechanical Properties of $B_4C$-based Ceramic Composites," Materials Science Forum, vols. 534-536 (2007) pp. 917-992.
S. Yamada, et al., "High-strength $B_4C$-$TiB_2$ composites fabricated by reaction hot-pressing," J. Eur. Ceram. Soc. 23 (2003) 1123-1130.
V. Skorokhod Jr., et al., "High strength-high toughness $B_4C$-$TiB_2$ composites," J. Mater. Sci. Lett. 19 (2000) 237-239.
Z. Zhang, et al., "Microstructures and mechanical properties of $B_4C$-SiC intergranular/intragranular nanocomposite ceramics fabricated from $B_4C$, Si, and graphite powders," J. Eur. Ceram. Soc. 34 (2014) 2153-2161.

* cited by examiner

BORON CARBIDE COMPOSITE AND PRODUCTION METHOD THEREFOR

CROSS-REFERENCE TO RELATED APPLICATION

This application claims under 35 U.S.C. § 119(a) the benefit of priority from Korean Patent Application No. 10-2020-0025539 filed on Feb. 28, 2020, the entire contents of which are incorporated herein by reference.

BACKGROUND

(a) Technical Field

The present disclosure relates to a boron carbide composite material and a method for producing the same, and more particularly, to a boron carbide composite material, which has excellent fracture toughness and fracture strength by containing boron carbide, silicon carbide and titanium boride and can be applied to general industrial parts, bulletproof ceramic materials and the like, and a method for producing the same.

(b) Background Art

Boron carbide is the third highest hardness material after diamond and cubic boron nitride. Boron carbide has properties such as excellent abrasion resistance due to high hardness, lightweight properties, excellent ballistic resistance, and high neutron absorption properties.

Boron carbide in the form of a sintered body is applied to industrial wear-resistant parts such as sandblasting nozzles, sliding friction parts and bearing liners, nuclear-power-related industrial parts such as neutron detectors, nuclear control rods and nuclear shielding, and lightweight bulletproof plate materials.

Since boron carbide has a strong covalent bond, a sintering temperature of 2,200° C. or higher is required to produce a high-density sintered body thereof. Thus, in order to lower the sintering temperature, sintering aids such as carbon (C), yttria ($Y_2O_3$), silicon carbide (SiC), alumina ($Al_2O_3$), or titanium boride ($TiB_2$) are used, or secondary phase compounds such as titanium oxide or titanium carbide, which form reaction products such as titanium boride by reaction with boron carbide at high temperature, are added. However, it is known that addition of the sintering aid or the secondary compound has effects such as reducing the hardness of boron carbide ($B_4C$) and degrading mechanical properties. Sintered boron carbide monoliths have excellent hardness compared to other structural ceramics such as silicon carbide, alumina, and zirconia, but other mechanical properties thereof, such as fracture strength and fracture toughness, are relatively low. In addition, not only is the production temperature of the boron carbide monoliths high, but also processing costs thereof are also high due to the high hardness, and thus the boron carbide monoliths are not widely applied to general industry.

Therefore, in order to expand the industrial application of sintered boron carbide, it is necessary not only to reduce the production cost by lowering the sintering temperature, but also to improve the fracture strength and fracture toughness of the sintered boron carbide.

In order to develop boron carbide composite materials having improved mechanical properties, the development of boron carbide composite materials in which silicon carbide, chromium boride ($CrB_2$) or titanium boride is combined with boron carbide has been made together with the development of sintering process technologies such as high-temperature pressure sintering, spark plasma sintering and atmospheric pressure sintering. In particular, since silicon carbide and titanium boride have excellent physical and chemical properties such as excellent hardness and excellent chemical stability, when they are combined with boron carbide, the excellent physical properties of boron carbide can be maintained to the greatest extent possible and the fracture toughness thereof can be increased. Therefore, in recent years, technologies related to boron carbide/silicon carbide ($B_4C$—SiC) composite materials, boron carbide/titanium boride ($B_4C$—$TiB_2$) and boron carbide/silicon carbide/titanium boride ($B_4C$—SiC—$TiB_2$) composite materials have been actively developed. For example, these technologies include a method of producing a sintered composite material by a general sintering method using boron carbide powders, silicon carbide powders and titanium boride powders, and a method of producing a sintered composite material using the elements or compounds constituting silicon carbide and titanium boride without using silicon carbide powders and titanium boride powders.

In boron carbide/silicon-carbide composite materials produced through a reactive sintering process, a composite material produced by mixing silicon powders and graphite powders in place of silicon carbide with boron carbide powders and subjecting the mixture to a reactive hot pressing at 1,900° C. or spark plasma sintering at 1,800° C. was found to have a fracture toughness of about 6 MPa·$m^{1/2}$, and a composite material produced by mixing titanium oxide powders and graphite powders in place of titanium boride powder with boron carbide powders or mixing titanium carbide powders with boron carbide powders and subjecting the mixture to a reactive hot pressing at 1,900° C. was found to have a fracture toughness of 6 MPa·$M^{1/2}$.

In U.S. Pat. No. 5,418,196, a boron carbide silicon carbide-titanium boride composite material was produced using sub-micrometer-sized boron carbide powder, silicon carbide powder and titanium carbide powder by uniaxial hot-pressing sintering with reactive sintering at a temperature of 2,150° C. The composite material is known to have a fracture toughness of 5 MPa·$m^{1/2}$ to 6 MPa·$M^{1/2}$.

Wen et al. developed a boron carbide/silicon carbide/titanium boride composite material having a fracture toughness of 8 MPa·$m^{1/2}$ by performing a reactive hot pressing on $Ti_3SiC_2$ powder and boron carbide powder at 1,850° C.

It is believed that, since a major factor that increases the fracture toughness of the boron carbide composite materials developed to date is the crack deflection caused by the titanium boride and silicon carbide phases dispersed in the composite materials, there is a limit to the extent to which the fracture toughness of the composite materials can be increased. Therefore, in order to improve the fracture toughness of the boron carbide composite material, it is required to develop composite material microstructures according to another concept using a reactive sintering process. In addition, although the use of fine boron carbide powder has generally been required in order to produce a high-density boron carbide composite material having excellent fracture toughness at a relatively low temperature, relatively large-sized boron carbide powder should be used in order to expand the industrial application of sintered boron carbide for the high economic efficiency.

PRIOR ART DOCUMENTS

Patent Documents (Patent Document 1) U.S. Pat. No. 5,418,196
(Patent Document 2) U.S. Pat. No. 7,442,661
(Patent Document 3) EP 1892227 B1

Non-Patent Documents (Non-Patent Document 1) 1. Z. Zhang, X. Du, Y. Wang, F. Zhang, W. Wang, Z. Fu, Microstructures and mechanical properties of B4C—SiC intergranular/intragranular nanocomposite ceramics fabricated from B4C, Si, and graphite powders, J. Eur. Ceram. Soc. 34 (2014) 2153-2161.
(Non-Patent Document 2) 2. F. Ye, Z. Hou, H. Zhang, L. Liu, Densification and mechanical properties of spark plasma sintered B4C with Si as a sintering aid, J. Am. Ceram. Soc. 93 (2010) 2956-2959.
(Non-Patent Document 3) 3. V. Skorokhod J R., V. D. Krstic, High strength-high toughness B4C—TiB2 composites, J. Mater. Sci. Lett. 19 (2000) 237-239.
(Non-Patent Document 4) 4. S. Yamada, K. Hirao, Y. Yamauchi, S. Kanzaki, High-strength B4C—TiB2 composites fabricated by reaction hot-pressing, J. Eur. Ceram. Soc. 23 (2003) 1123-1130.

SUMMARY OF THE DISCLOSURE

An object of the present disclosure is to further improve the fracture toughness of a boron carbide composite material.

Another object of the present disclosure is to provide a method capable of producing a boron carbide composite material having excellent fracture toughness and fracture strength even at a low sintering temperature.

Still another object of the present disclosure is to provide a method capable of producing a boron carbide composite material having excellent fracture toughness and fracture strength even without using expensive fine boron carbide.

To achieve the above objects, the present disclosure proposes a boron carbide/silicon carbide/titanium boride/graphite composite material, which is a new boron carbide composite material having excellent fracture toughness, and a production method therefor. In addition, the present disclosure proposes an optimal production process that uses a selected boron carbide raw material and silicon carbide raw material having various sizes to economically produce a boron carbide composite material.

DETAILED DESCRIPTION

Hereinafter, the present disclosure will be described in detail.

A method for producing a boron carbide composite material according to the present disclosure includes steps of: preparing starting materials including boron carbide ($B_4C$), at least one silicon source selected from among silicon carbide (SiC) and silicon (Si), and titanium carbide (TiC); pressing the starting materials to obtain a green body; and sintering the green body to obtain the boron carbide composite material.

The present disclosure is characterized in that, by controlling the average particle diameter and content of each component included in the starting material, the fracture toughness and fracture strength of the boron carbide composite material are improved and the sintering temperature is lowered. This will be described in detail below in connection with Examples.

The starting materials may include 60 wt % to 90 wt % of the boron carbide, 5 wt % to 30 wt % of the silicon source, and 5 wt % to 30 wt % of the titanium carbide. The composition of the starting materials may be appropriately controlled according to the desired composition of the finally obtained boron carbide composite material. However, in order to improve the fracture toughness and fracture strength of the boron carbide composite material, the content of the boron carbide may preferably be 60 wt % to 80 wt %.

The average particle diameter of each component in the starting materials is associated with the green density of the pressed body, which is a factor influencing the fracture toughness and fracture strength of the boron carbide composite material. Although not limited thereto, the boron carbide may have an average particle diameter of 0.5 µm to 250 µm, the silicon source may have an average particle diameter of 0.5 µm to 3 µm, and the titanium carbide may have an average particle diameter of 0.5 µm to 3 µm.

In particular, as the boron carbide, multiple types of powders having different average particle diameters may be used, so the green density of the pressed body may be 60% or more. Specifically, two or three different types of boron carbide powders having different average particle diameters may be used. Here, the two or three different kinds of boron carbide powders do not mean that the boron carbide powders have different compositions, but mean that the boron carbide powders have different average particle diameters.

In addition, when plurality of powders having different average particle diameters is used as the boron carbide, the weight ratio of the powder having the largest average particle diameter among the plurality of powders may be adjusted to 0.7 or less, 0.5 or less, or 0.4 or less, relative to the total content of the boron carbide. The weight ratio may be appropriately controlled in consideration of the average particle diameter of each of plurality of powders. For example, when two types of boron carbide powders are used and the size of the powder having the largest average particle diameter is 10 µm or less, the weight ratio of the powder having the largest average particle diameter may preferably be 0.7 or less. Meanwhile, when three types of boron carbide powders are used and the size of the powder having the largest average particle diameter is 40 µm to 250 µm, the weight ratio of the powder having the largest average particle diameter may preferably be 0.4 or less.

The production method according to the present disclosure may further include a step of grinding the starting materials, before pressing the starting materials. For the grinding of the starting materials, any method may be used without limitation, as long as it is a method that is widely used in the technical field to which the present disclosure pertains. For example, a method such as ball milling may be used.

In addition, the production method may further include a step of sieving the ground material. Here, the size of the sieve is not particularly limited, and may be appropriately controlled according to the average particle diameter of the starting materials. For example, the ground material may be sieved with a sieve having a mesh size of 45 μm to 1 mm.

The starting materials may be pressed to obtain a green body. Specifically, the starting materials may be uniaxially pressed or hydrostatically pressed to obtain a green body having a molding density of 60% or more.

The pressure that is applied to the starting materials is not particularly limited, and a pressure that causes no damage to the starting materials may be applied. For example, a pressure of 70 MPa or more may be applied.

The relative green density may be expressed by the following equation:

Relative green density[%]=(bulk density of green body/true density of green body)×100

Here, the bulk density refers to a density based on volume including inter-particle voids, and the true density refers to the density only of portions occupied by material, excluding the inter-particle voids.

Thereafter, the green body may be sintered under pressure to obtain a boron carbide composite material.

Sintering of the green body may be performed by: heating the green body to a temperature of 1,300° C. to 1,600° C. at a rate of 5° C./min to 10° C./min under a vacuum ($10^{-2}$ Torr) atmosphere while applying a pressure of 10 MPa to 20 MPa; heating the green body to a temperature of 1,800° C. to 2,100° C. at a rate of 2° C./min to 15° C./min under an inert gas atmosphere such as an argon gas atmosphere while increasing the pressure to a pressure of 30 MPa to 40 MPa; then sintering the green body for 2 hours to 5 hours; and cooling the sintered product to a temperature of 1,000° C. to 1,400° C. at a rate of 2° C./min to 10° C./min.

In the process of sintering the green body, reactions of the following Reaction Formula 1 and/or Reaction Formula 2 may occur to form silicon carbide, titanium boride, and graphite on a boron carbide matrix:

$B_4C+SiC+2TiC \rightarrow SiC+2TiB_2+3C$   [Reaction Formula 1]

$B_4C+Si+2TiC \rightarrow SiC+2TiB_2+2C$   [Reaction Formula 2]

The boron carbide composite material obtained by the production method as described above includes: a matrix including boron carbide ($B_4C$), and a dispersion uniformly dispersed in the matrix, wherein the dispersion includes: a particulate dispersion including silicon carbide (SiC) and titanium boride ($TiB_2$); and graphite in the form of a sheet-like dispersion.

Figure 1:
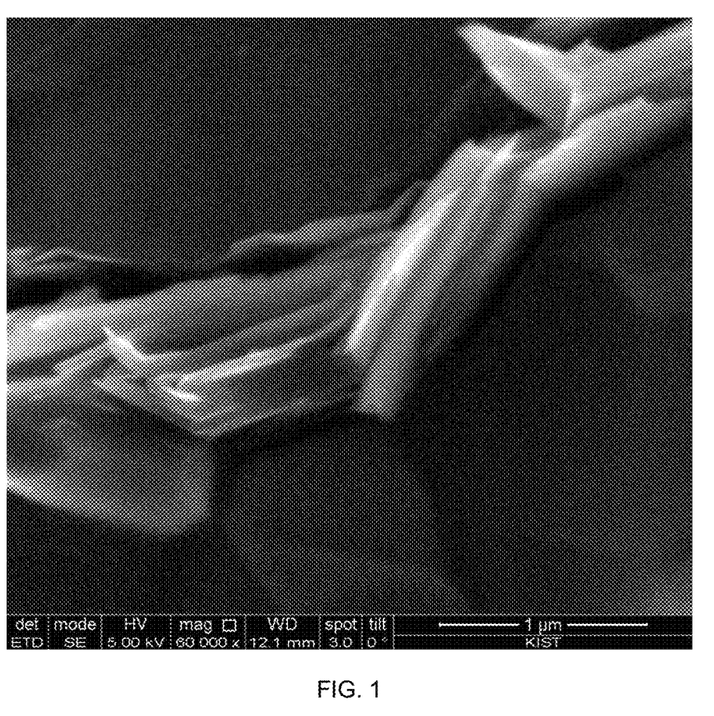
FIG. 1 shows the result of scanning electron microscope analysis of a boron carbide composite material according to the present disclosure.

FIG. 1 shows the result of scanning electron microscope analysis of the boron carbide composite material according to the present disclosure. Referring thereto, it can be seen that graphite exists between the boron carbide grains of the boron carbide composite material.

Figure 2:
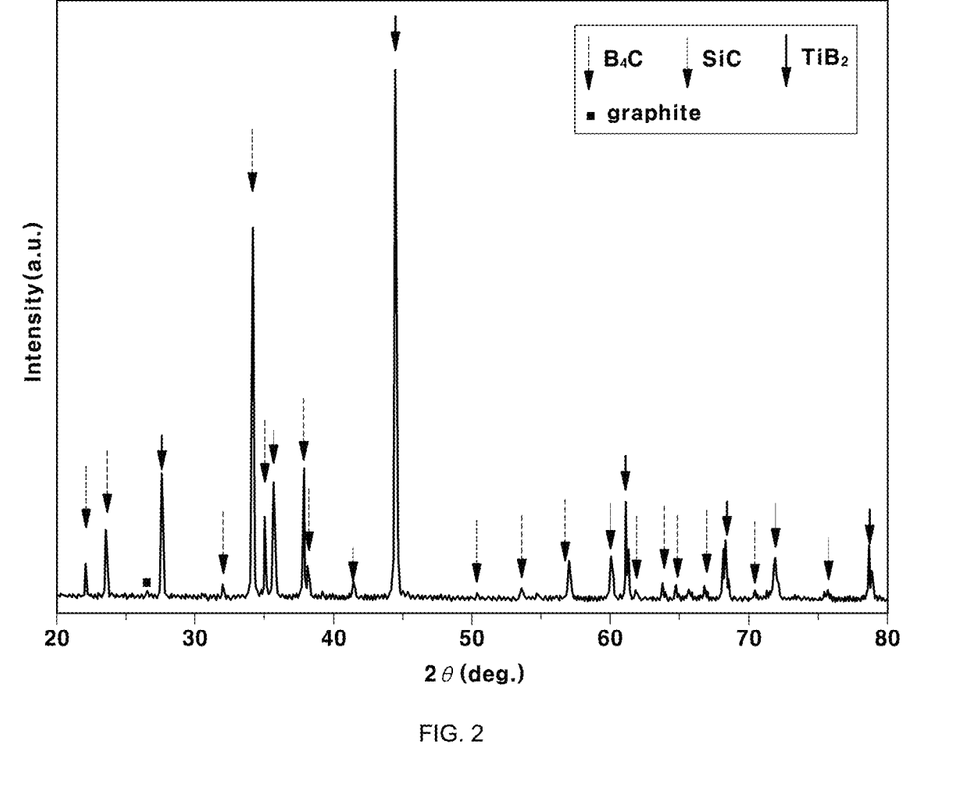
FIG. 2 shows the result of X-ray diffraction pattern analysis of a boron carbide composite material according to the present disclosure.

FIG. 2 shows the result of X-ray diffraction pattern analysis of the boron carbide composite material according to the present disclosure. Referring thereto, it can be seen that boron carbide, silicon carbide, and titanium boride exist in the boron carbide composite material, and the peak of graphite can also be confirmed.

The boron carbide composite material may include 5 wt % to 20 wt % of the silicon carbide, 5 wt % to 35 wt % of the titanium boride, 3 wt % to 9 wt % of graphite, and the balance of boron carbide.

The boron carbide composite material may have a fracture strength of 300 MPa or more and a fracture toughness of 6 MPa·$M^{1/2}$ or more. In addition, the grain diameter of the matrix may be 1 μm to 300 μm, and may change to 1 μm or less, 3 μm, 45 μm, 75 μm, or 130 μm or more depending on the maximum size of the boron carbide powder used as a starting material. Since the mechanical properties of the boron carbide composite material differ depending on the maximum size of the boron carbide grains, the starting materials may be variably selected and used according to the properties required by a given industry.

The size of the largest boron carbide grains in the matrix is proportional to the maximum average particle diameter of the boron carbide powder that is used as a starting material. In addition, the content of the largest grains relative to the total grain volume is proportional to the content of boron carbide having the largest average particle diameter that is used as a starting material, and the proportion thereof may preferably be 25% to 80% in terms of improving the fracture toughness and fracture strength of the boron carbide composite material. Although not limited thereto, the size of the largest grains may show a difference of ±15% from the size of the boron carbide powder having the largest average particle diameter used as a starting material.

Hereinafter, the present disclosure will be described in detail with reference to examples, but the scope of the present disclosure is not limited by these examples.

Example 1

To produce a boron carbide composite having high toughness, as shown in Table 1 below, two types of boron carbide powders having different average particle diameters were used, and silicon carbide and titanium carbide powders having an average particle diameter of 0.5 μm were used as the materials to be combined with the boron carbide powders.

The starting material powders were mixed together by ball milling using silicon carbide balls and an ethyl alcohol solvent for 2 hours, dried at 80° C. for 12 hours, and then sieved with a sieve having a mesh size of 45 μm.

The starting materials prepared as described above were uniaxially pressed at a pressure of 70 MPa or more so that the green molding density was 60% or more, thereby producing a green body.

The green body was charged into a boron nitride-coated graphite mold in a uniaxial hot-pressing sintering apparatus and heated to a temperature of 1,500° C. at a heating rate of 5° C./min under a vacuum atmosphere ($10^{-2}$ Torr) while applying a pressure of 10 MPa thereto. Thereafter, the green body was heated to a temperature of 1,950 to 2,000° C. at a heating rate of 5° C./min under an argon gas atmosphere while the pressure was increased, and was then subjected to pressing reactive sintering for 2 hours while maintaining a pressure of 30 MPa. After completion of the sintering, the resulting material was cooled to a temperature of 1,400° C. at a rate of 5° C./min, and was then furnace-cooled to obtain a boron carbide composite material.

Referring to Table 1 below, the boron carbide composite material having a sintering density of 98.8% was sintered even at a relatively low temperature of 1,950° C. As the sintering temperature of the same composition increased from 1,950° C. to 2,000° C., the density of the sintered product increased, and the fracture toughness, fracture strength, and hardness thereof also increased. As the amount of titanium carbide added was increased from 10 wt % to 30 wt %, the fracture strength and fracture toughness of the sintered product increased to 597 MPa and 10.3 MPa·$M^{1/2}$, respectively, and the density of the sintered product increased to 99.4%.

TABLE 1

| No. | Particle size (μm)/composition (wt %) | | | Sintering temperature Fracture toughness | Molding density Fracture strength | Sintering density |
|---|---|---|---|---|---|---|
| | B$_4$C | SiC | TiC | | | |
| 1 | 0.5 μm 24% | 3 μm 56% | 10% | 10% | 1,950° C. 7.9 MPa·m$^{1/2}$ | 69.6% 467 MPa | 98.8% |
| 2 | 0.5 μm 24% | 3 μm 56% | 10% | 10% | 2,000° C. 8.2 MPa·m$^{1/2}$ | 69.7% 512 MPa | 99.1% |
| 3 | 0.5 μm 21% | 3 μm 49% | 10% | 20% | 2,000° C. 9.5 MPa·m$^{1/2}$ | 69.2% 563 MPa | 99.3% |
| 4 | 0.5 μm 18% | 3 μm 42% | 10% | 30% | 2,000° C. 10.3 MPa·m$^{1/2}$ | 68.3% 597 MPa | 99.4% |
| 5 | 0.5 μm 21% | 3 μm 49% | 20% | 10% | 2,000° C. 7.4 MPa·m$^{1/2}$ | 69.5% 522 MPa | 98.5% |
| 6 | 0.5 μm 21% | 3 μm 49% | 15% | 15% | 2,000° C. 8.4 MPa·m$^{1/2}$ | 68.7% 582 MPa | 98.5% |

Example 2

To produce a boron carbide composite having high toughness, as shown in Table 2 below, three types of boron carbide powders having five different average particle diameters (0.5, 3, 45, 75 and 130 μm) were used in combination, and silicon carbide and titanium carbide powders having an average particle diameter of 0.5 μm were used as the materials to be combined with the boron carbide powders.

The starting material powders were mixed together by ball milling using silicon carbide balls and an ethyl alcohol solvent for 2 hours, dried at 80° C. for 12 hours, and then sieved with a sieve having a mesh size of 1 mm.

The starting materials prepared as described above were uniaxially pressed at a pressure of 100 MPa or more so that the molding density was 60% or more, thereby producing a green body.

The green body was charged into a boron nitride-coated graphite mold in a uniaxial hot-pressing sintering apparatus and heated to a temperature of 1,500° C. at a heating rate of 5° C./min under a vacuum atmosphere (10$^{-2}$ Torr) while a pressure of 10 MPa was applied thereto. Thereafter, the green body was heated to a temperature of 2,000° C. at a heating rate of 5° C./min under an argon gas atmosphere while the pressure was increased, and was then subjected to pressing reactive sintering for 2 hours while maintaining a pressure of 30 MPa. After completion of the sintering, the resulting material was cooled to a temperature of 1,400° C. at a rate of 5° C./min, and was then furnace-cooled to obtain a boron carbide composite material.

Referring to Table 2 below, the maximum particle diameter of the boron carbide powder added to increase the density of the green body was increased from 45 μm to 130 μm, and as the maximum particle diameter of the boron carbide powder was increased, the molding density increased up to 72.7%, but the fracture toughness and fracture strength of the boron carbide composite material produced by performing pressing reactive sintering on three types of boron carbide powders having different particle sizes as described above decreased to 6.1 MPa·M$^{1/2}$ and 335 MPa, respectively.

TABLE 2

| No. | Particle size (μm)/composition (wt %) | | | | | Sintering temperature Fracture toughness | Molding density Fracture strength | Sintering density |
|---|---|---|---|---|---|---|---|---|
| | B$_4$C | | | SiC | TiC | | | |
| 1 | 0.5 μm 16% | 3 μm 32% | 45 μm 32% | 10% | 10% | 2,000° C. 7.1 MPa·m$^{1/2}$ | 71.16% 408 MPa | 99.4% |
| 2 | 0.5 μm 16% | 3 μm 32% | 75 μm 32% | 10% | 10% | 2,000° C. 6.4 MPa·m$^{1/2}$ | 71.3% 372 MPa | 99.1% |
| 3 | 0.5 μm 16% | 3 μm 32% | 130 μm 32% | 10% | 10% | 2,000° C. 6.1 MPa·m$^{1/2}$ | 72.7% 335 MPa | 98.2% |
| 4 | 0.5 μm 14% | 3 μm 28% | 130 μm 28% | 10% | 20% | 2,000° C. 6.7 MPa·m$^{1/2}$ | 73.1% 363 MPa | 99.2% |
| 5 | 0.5 μm 12% | 3 μm 24% | 130 μm 24% | 10% | 30% | 2,000° C. 8.2 MPa·m$^{1/2}$ | 72.4% 412 MPa | 99.5% |

Figure 3:
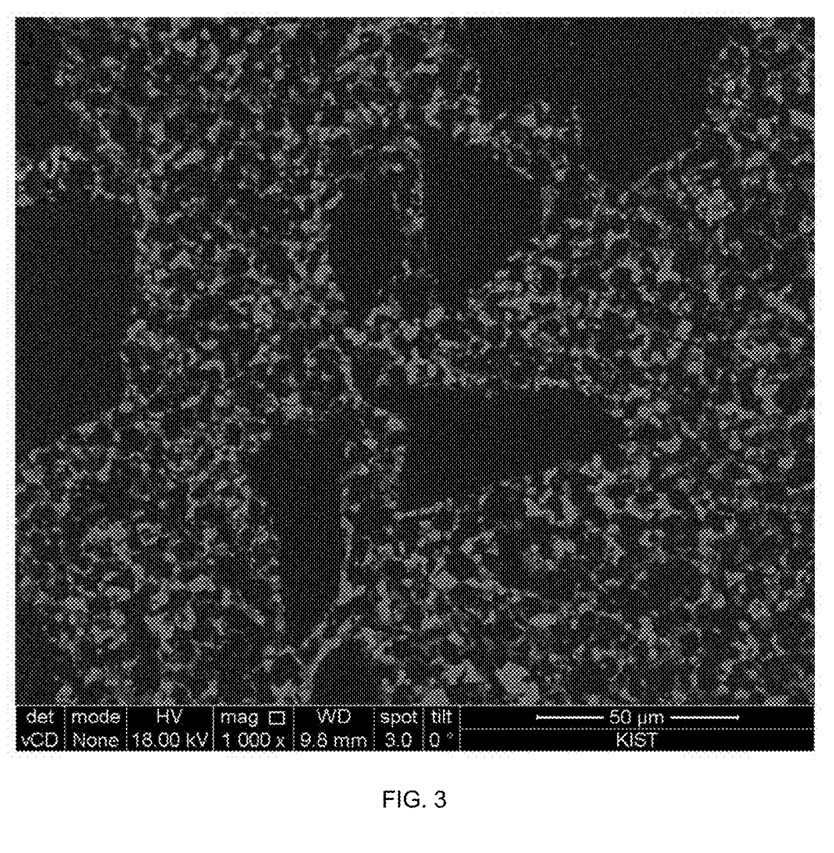
FIG. 3 shows the result of back-scattering electron mode analysis of a boron carbide composite material according to Example 2.

FIG. 3 shows the result of back-scattering electron mode analysis of the boron carbide composite material produced using the boron carbide powder having the maximum average particle diameter of 45 μm in Example 2. Referring thereto, it can be seen that grains having a size of about 40 μm were formed in the boron carbide composite material.

Figure 4:
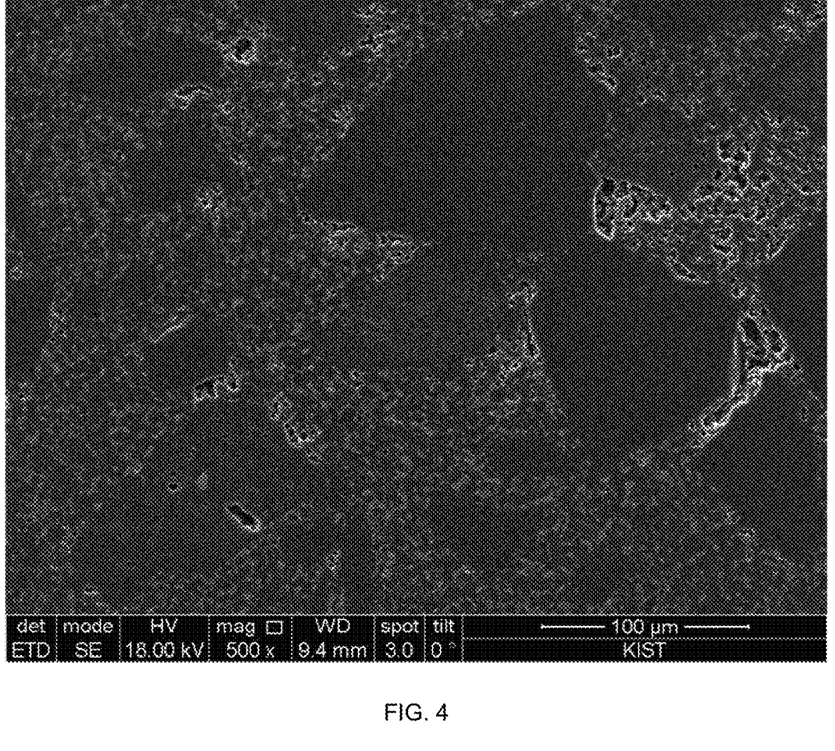
FIG. 4 shows the result of secondary electron mode analysis of a boron carbide composite material according to Example 2.

FIG. 4 shows the result of back-scattering electron mode analysis of the boron carbide composite material produced using the boron carbide powder having the maximum average particle diameter of 130 μm in Example 2. Referring thereto, it can be seen that grains having a size of about 100 μm were formed in the boron carbide composite material.

Example 3

To produce a boron carbide composite having high toughness, as shown in Table 3 below, three types of boron carbide powders having three different average particle diameters (0.5, 3 and 130 μm) were used in combination, and silicon carbide, silicon and titanium carbide powders having an average particle diameter of 0.5 μm were used as the materials to be combined with the boron carbide powders.

The starting material powders were mixed together by ball milling using silicon carbide balls and an ethyl alcohol solvent for 2 hours, dried at 80° C. for 12 hours, and then sieved with a sieve having a mesh size of 1 mm.

The starting materials prepared as described above were uniaxially pressed at a pressure of 100 MPa or more so that the molding density was 60% or more, thereby producing a green body.

The green body was charged into a boron nitride-coated graphite mold in a uniaxial hot-pressing sintering apparatus and heated to a temperature of 1,500° C. at a heating rate of 5° C./min under a vacuum atmosphere ($10^{-2}$ Torr) while applying a pressure of 10 MPa thereto. Thereafter, the green body was heated to a temperature of 1,950 at a heating rate of 5° C./min under an argon gas atmosphere while the pressure was increased, and was then subjected to pressing reactive sintering for 2 hours while maintaining a pressure of 30 MPa. After completion of the sintering, the resulting material was cooled to a temperature of 1,400° C. at a rate of 5° C./min, and was then furnace-cooled to obtain a boron carbide composite material.

The boron carbide composite material was produced by mixing silicon carbide, which is used as a sintering aid to improve the sintering density and physical properties of the boron carbide composite material, with silicon at a predetermined ratio.

Silicon reacts with boron carbide during heat treatment to form a boron-silicon-carbon intermediate compound, and is synthesized into silicon carbide as sintering proceeds. Thus, silicon contributes to improving the physical properties and sinterability of the boron carbide composite material.

Referring to Table 3, it can be seen that, when silicon was added in place of a portion of the amount of silicon carbide that was added, it was possible to produce a boron carbide composite material having a high sintering density of 98% or more at a relatively low sintering temperature of 1,950° C. The fracture toughness and fracture strength of the boron carbide composite material produced by replacing 10 wt % of silicon carbide with the same weight of silicon increased to 7.6 MPa·m$^{1/2}$ and 552 MPa, respectively.

TABLE 3

| No. | Particle size (μm)/composition (wt %) | | | | | | Sintering temperature Fracture toughness | Molding density Fracture strength | Sintering density |
|---|---|---|---|---|---|---|---|---|---|
| | | B$_4$C | Si | Sic | Tic | | | | |
| 1 | 0.5 μm 16% | 3 μm 32% | 130 μm 32% | 0% | 10% | 10% | 2,000° C. 6.1 MPa·m$^{1/2}$ | 72.7% 320 MPa | 98.2% |
| 2 | 0.5 μm 16% | 3 μm 32% | 130 μm 32% | 5% | 5% | 10% | 1,950° C. 6.5 MPa·m$^{1/2}$ | 73.1% 425 MPa | 98.9% |
| 3 | 0.5 μm 16% | 3 μm 32% | 130 μm 32% | 10% | 0% | 10% | 1,950° C. 7.6 MPa·m$^{1/2}$ | 72.9% 552 MPa | 99.4% |
| 4 | 0.5 μm 14% | 3 μm 28% | 130 μm 28% | 5% | 5% | 20% | 1,950° C. 7.4 MPa·m$^{1/2}$ | 72.7% 547 MPa | 99.5% |
| 5 | 0.5 μm 12% | 3 μm 28% | 130 μm 28% | 10% | 0% | 20% | 1,950° C. 8.4 MPa·m$^{1/2}$ | 72.5% 581 MPa | 99.7% |

The boron carbide composite material having excellent mechanical properties, developed in the present disclosure, may be applied to general industrial wear-resistant parts such as sandblasting nozzles, sliding friction parts and bearing liners, and nuclear-power-related industrial parts such as neutron detectors, nuclear control rods and nuclear shielding. In particular, the boron carbide composite material may be actively used as a lightweight bulletproof material for personal use and for military aircrafts including helicopters, demand for which is rapidly increasing domestically and worldwide.

As described above, the boron carbide composite material according to the present disclosure has a very good fracture toughness of 6 MPa·m$^{1/2}$ to 11 MPa·m$^{1/2}$, a very good fracture strength of 300 MPa to 600 MPa, and a sintering temperature of 1,950° C. to 2,000° C., which is lower than that of the prior art.

In addition, the present disclosure is suitable for mass production in terms of cost compared to the prior art, because boron carbide powder having a relatively large particle diameter on the order of micrometers is used as a starting material for producing a boron carbide composite material.

In addition, according to the present disclosure, the mechanical properties of the boron carbide composite material may be realized to a desired degree by controlling the average particle diameter of the starting material powder, and thus the boron carbide composite material may be used in various applications.

In addition, according to the present disclosure, because the sintering temperature may be effectively controlled by controlling the composition of the starting materials, the present disclosure is suitable for mass production in terms of cost, and has excellent versatility in terms of application of processes thereto.

The present disclosure has been described in detail with reference to the embodiments. However, the scope of the present disclosure is not limited to the embodiments, and should be interpreted based on the matters set forth in the appended claims.

What is claimed is:

1. A carbide composite material comprising:
   a matrix comprising boron carbide (B$_4$C); and
   a dispersion dispersed in the matrix,
   wherein the dispersion comprises: a particulate dispersion comprising silicon carbide (SiC) and titanium boride (TiB$_2$); and graphite in a form of a sheet-like dispersion; and
   wherein the matrix has a grain diameter of 1 μm to 300 μm; and
   wherein a volume proportion of boron carbide grains having a size comparable to a maximum size of boron carbide powder used as a starting material is 25% to 80% relative to a volume of boron carbide grains in the matrix.

2. The carbide composite material of claim 1, comprising:
   5 wt % to 20 wt % of the silicon carbide; 5 wt % to 35 wt % of the titanium boride; 3 wt % to 9 wt % of the graphite, and the balance of the boron carbide.

3. The carbide composite material of claim 1, having a fracture strength of 300 MPa or more and a fracture toughness of 6 MPa·m$^{1/2}$ or more.

4. A method for producing the carbide composite material of claim 1, the method comprising steps of:

preparing starting materials including boron carbide ($B_4C$), at least one silicon source selected from among silicon carbide (SiC) and silicon (Si), and titanium carbide (TiC);

pressing the starting materials to obtain a green body; and sintering the green body to obtain the carbide composite material.

5. The method of claim 4, wherein the starting materials include:

60 wt % to 90 wt % of the carbide;

5 wt % to 30 wt % of the silicon source; and 5 wt % to 30 wt % of the titanium carbide.

6. The method of claim 4, wherein the boron carbide comprises multiple types of powders having different average particle diameters, and a weight ratio of a powder having a largest average particle diameter among the multiple types of powders is 0.7 or less relative to a total content of the boron carbide.

7. The method of claim 4, wherein the silicon source has an average particle diameter of 0.5 μm to 3 μm, and the titanium carbide has an average particle diameter of 0.5 μm to 3 μm.

8. The method of claim 4, further comprising a step of mixing the starting materials together, before pressing the starting materials.

9. The method of claim 4, wherein the starting materials are uniaxially pressed or hydrostatically pressed to obtain a green body having a green density of 60% or more.

10. The method of claim 4, wherein the green body is sintered under pressure to obtain the boron carbide composite material.

11. The method of claim 4, wherein the sintering the green body is performed by:

heating the green body to a temperature of 1,300° C. to 1,600° C. at a rate of 5° C./min to 10° C./min under a vacuum atmosphere while applying a pressure of 10 MPa to 20 MPa;

heating the green body to a temperature of 1,800° C. to 2,100° C. at a rate of 2° C./min to 15° C./min under an inert gas atmosphere gas while increasing the pressure to a pressure of 30 MPa to 40 MPa, and then sintering the green body for 2 hours to 5 hours; and cooling the sintered product to a temperature of 1,000° C. to 1,400° C. at a rate of 2° C./min to 10° C./min.

* * * * *